United States Patent [19]
Iwahara et al.

[11] Patent Number: 5,467,221
[45] Date of Patent: Nov. 14, 1995

[54] MULTI-SCREEN PROJECTOR

[75] Inventors: Yoshiaki Iwahara, Yokosuka; Shoji Kuroda, Odawara; Shuichi Sakamoto; Masanori Ogino, both of Yokohama, Japan

[73] Assignee: Hitachi, Ltd., Tokyo, Japan

[21] Appl. No.: 290,146

[22] Filed: Aug. 15, 1994

[30] Foreign Application Priority Data

Nov. 30, 1993 [JP] Japan .................................. 5-300209

[51] Int. Cl.⁶ .................................................. G03B 21/56
[52] U.S. Cl. .......................................... 359/449; 359/457
[58] Field of Search .................................. 359/449, 453, 359/456, 457, 460

[56] References Cited

U.S. PATENT DOCUMENTS 4,919,518  4/1990  Ogino .................................. 350/128
4,961,642  10/1990  Ogino .................................. 353/38
5,085,495  2/1992  Iwahara et al. ..................... 395/455

FOREIGN PATENT DOCUMENTS 6-229586  11/1985  Japan .
63-56881  4/1988  Japan .

*Primary Examiner*—Richard A. Wintercorn
*Attorney, Agent, or Firm*—Antonelli, Terry, Stout & Kraus

[57] ABSTRACT

A multi-screen projector having unit module projectors stacked at two higher and lower stages, each unit module projector having a screen with a Fresnel sheet unit, a prism sheet unit, and a lenticular sheet unit. By the functions of the Fresnel sheet unit and the prism sheet unit, main output light from higher and lower screens is converged to substantially the same target point. Only one type of metal molds is required for the Fresnel sheet unit as well as the prism sheet unit, thereby reducing the manufacturing cost of the multi-screen projector.

13 Claims, 18 Drawing Sheets

FIG. 4A
PRIOR ART
FIG. 4B
PRIOR ART
FIG. 4D
PRIOR ART
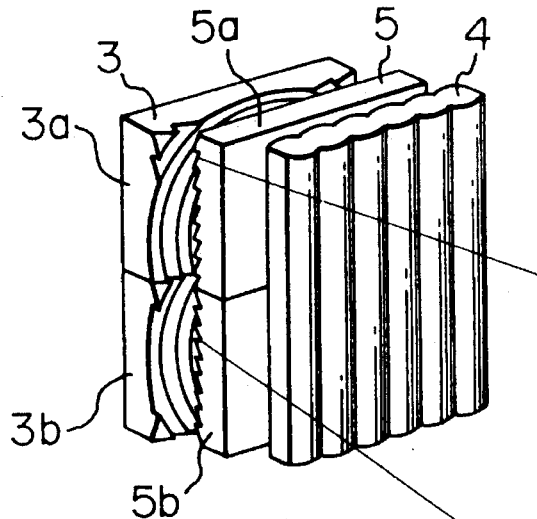
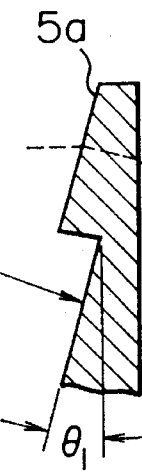
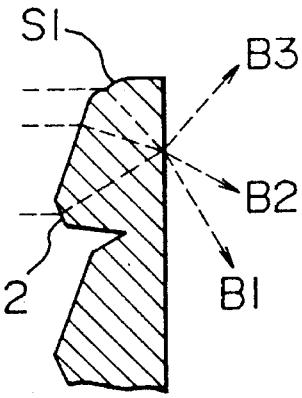
FIG. 4C
PRIOR ART
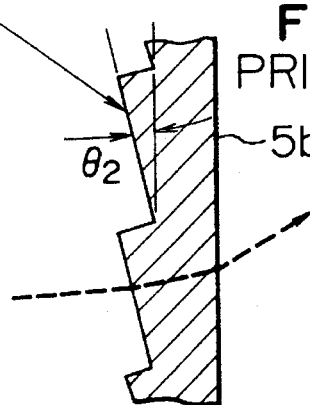
FIG. 5
PRIOR ART
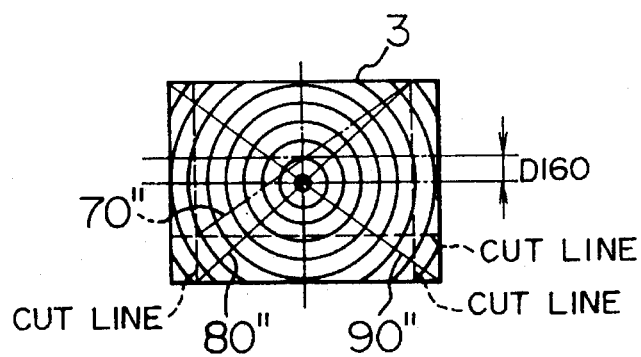

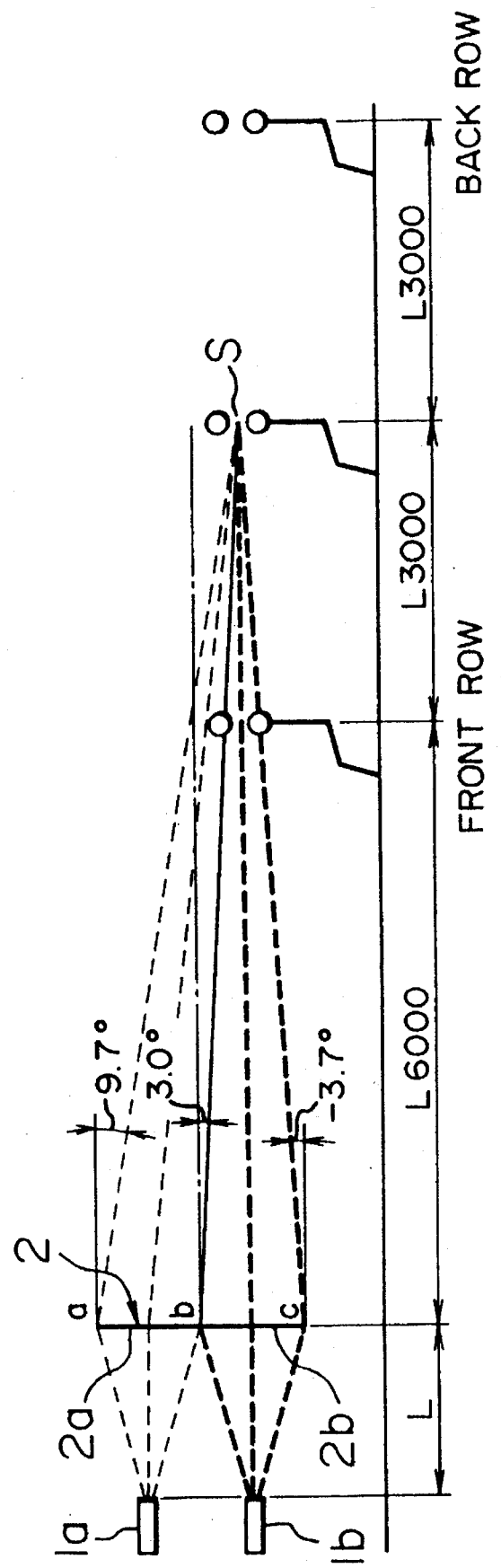

FIG. 14
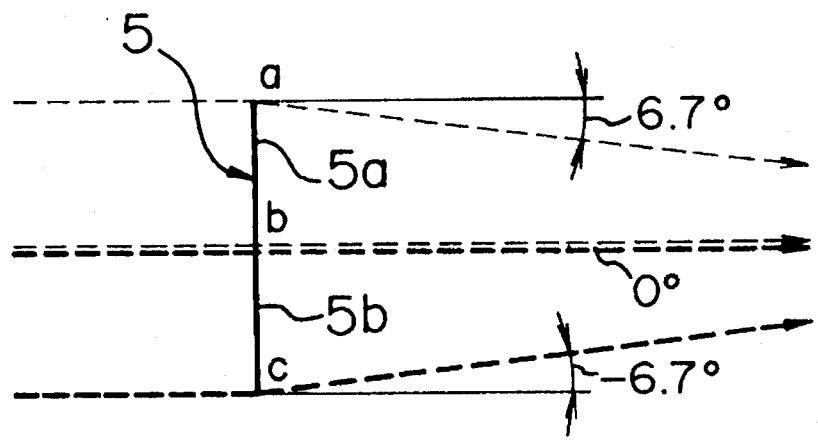
FIG. 15A   FIG. 15B
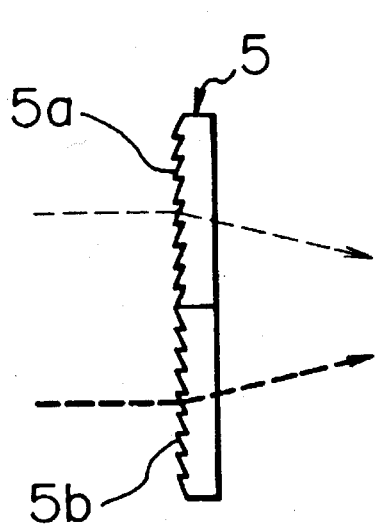
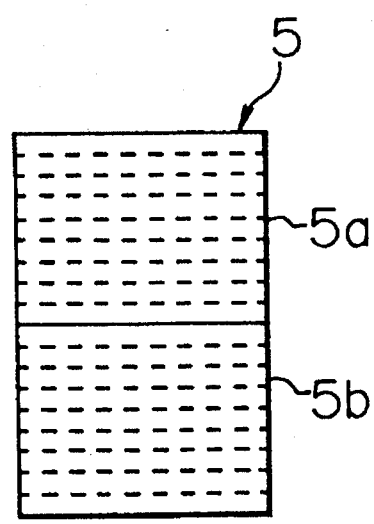

FIG. 16
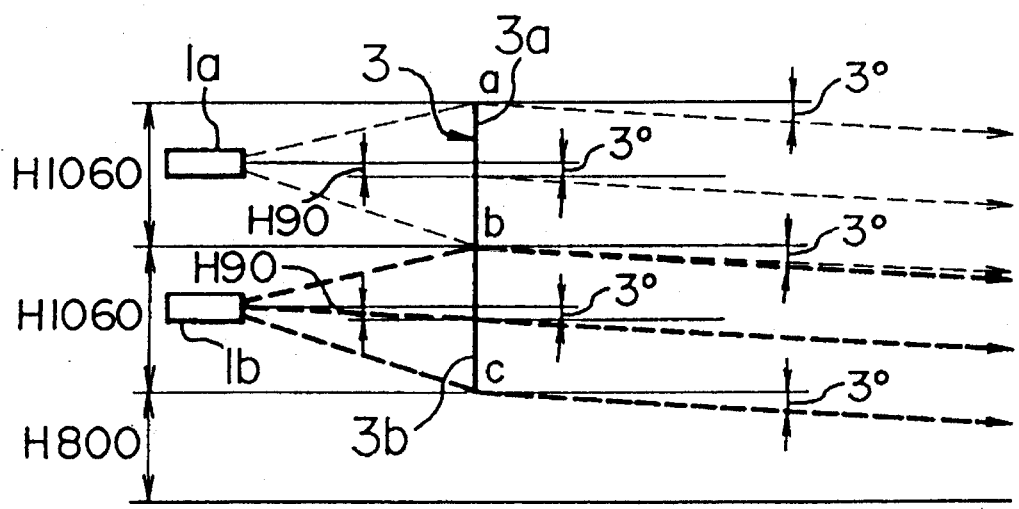
FIG. 17A  FIG. 17B
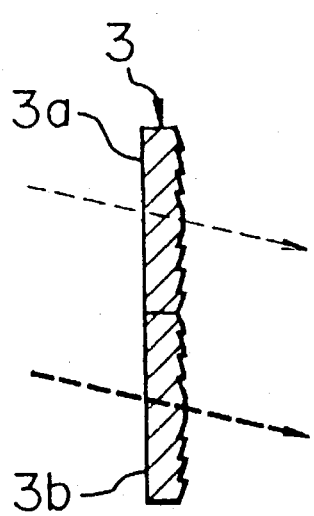
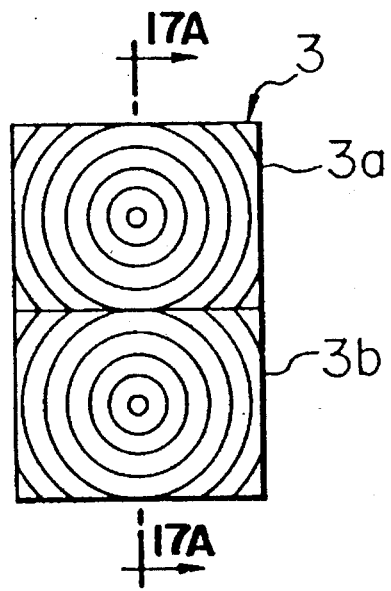

FIG. 20
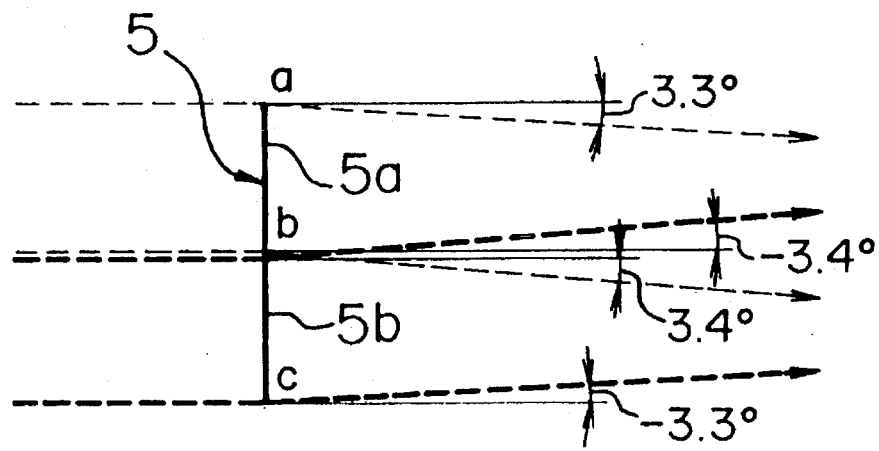
FIG. 21A   FIG. 21B
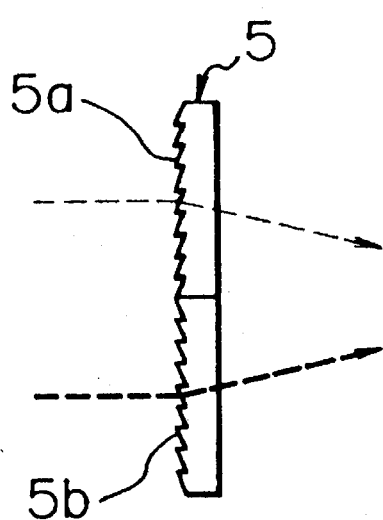 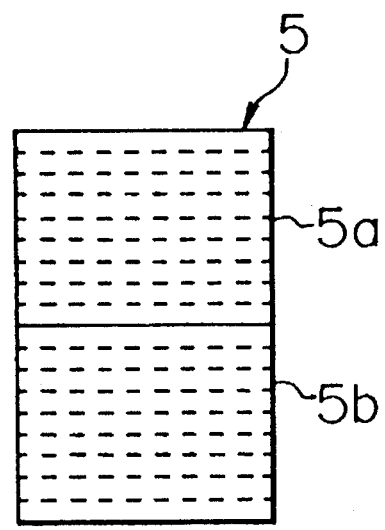

MULTI-SCREEN PROJECTOR

BACKGROUND OF THE INVENTION

1. Field of the Invention

The present invention relates to a multi-screen projector having at least two unit module projectors stacked one upon another, and more particularly to a means for converging output light from unit module projectors to audiences.

2. Description of the Related Art

A conventional multi-screen projector having at least two unit module projectors stacked one upon another has a structure such as shown in FIG. 1. A higher projector unit 1a and a lower projector unit 1b respectively for higher and lower unit module projectors each have an image receiving tube and a projection lens. A higher screen 2a and a lower screen 2b are used respectively for the higher and lower unit module projectors.

In FIG. 1, the two unit module projectors piled up one upon the other constitute one multi-screen projector. The higher projector unit 1a and higher screen 2a constitute the higher unit module projector, and the lower projector unit 1b and lower screen 2b constitute the lower unit module projector. Each unit module projector has a screen size of 70 inches. The front and back rows of audiences are positioned remote from the screens 2a and 2b by 6 m (L6000) and 12 m (L6000+L3000+L3000), respectively. The center S of audiences is set at the middle point between the eyes of a standing audience and the eyes of a sitting audience at the middle row remote from the screens 2a and 2b by 9 m.

Each of the screen 2a and 2b has two sheet means, a Fresnel sheet means on the light input side and a lenticular sheet means on the light output side. Light of an enlarged image projected from the projector units 1a and 1b onto the screens 2a and 2b is converged to a predetermined position of audiences. The optical axis of the projection lens of the higher projector unit 1a coincides with the optical axis of the higher screen 2a, and the optical axis of the projection lens of the lower projector unit 1b coincides with the optical axis of the lower screen 2b, the axes being in parallel with the plane on which the multi-screen projector is installed. The optical axis of the lower screen 2b passes through the center S of audiences. The Fresnel sheet means and lenticular sheet means of the screens 2a and 2b are so structured that the convergence points (Fresnel conjugate points) $k_2$ and $k_1$ are on the optical axes of the screens 2a and 2b near a line perpendicular to the installation plane and passing through the center S of audiences. The Fresnel conjugate point $k_1$ of the lower screen 2b coincides with the center S of audiences, and the Fresnel conjugate point $k_2$ of the higher screen 2a is at the position higher than the Fresnel conjugate point $k_1$ by the height of the screens 2a and 2b.

With the configuration of the multi-screen projector described above, the line A of sight of a sitting audience at the front row extending to the interface b between the screens 2a and 2b is deviated by about 10° from the main output light from the lower end b of the higher screen 2a, and is slightly deviated by about 3° from the main output light from the upper end b of the lower screen 2b. Light diffused from the screens 2a and 2b becomes dark as it becomes remote from the main output light. Because there is a large difference of angles, an audience at the front row visually senses a large difference of brightness between the higher and lower screens 2a and 2b, loosing uniformity of brightness of the multi-screen. This phenomenon is also true for sitting audiences at the middle and back rows.

FIG. 2 shows another example of a conventional multi-screen projector. Like elements to those shown in FIG. 1 are represented by using identical reference numerals and characters.

In FIG. 2, a line B is in parallel with the installation plane and is extending to the interface b between the screens 2a and 2b. The optical axes of the screens 2a and 2b are symmetrical with the parallel line B, and the Fresnel conjugate point k of the screens 2a and 2b is an intersection between the parallel line B and a line perpendicular to the installation plane and passing through the center S of audiences.

The direction of the main output light from the lower end b of the higher screen 2a is the same as that of the main output light from the lower end b of the lower screen b. Therefore, relative to both the main output light beams, the angles of the line A of sight of a sitting audience at the front row extending to the interface b between the screens 2a and 2b are the same and take a value of about 6°. The sitting audience at the front row visually senses a uniform brightness of the multi-screen 2 made of the screens 2a and 2b.

However, the main output light beams converge to the position higher than the center S of audiences. Therefore, the line A of sight of audiences becomes remote from the main output light beams, darkening the multi-screen 2 as a whole.

One of the methods of solving such a problem is disclosed, for example, in JP-U-63-56881 and JP-A-60-229586. According to this related art, as shown in FIGS. 3A, 3B, and 3C, of a Fresnel sheet means 3, a decenter of a Fresnel lens of a Fresnel sheet means (higher Fresnel sheet means) 3a for the screen 2a is set much lower at D160 (160 mm), whereas a decenter of a Fresnel lens of a Fresnel sheet means (lower Fresnel sheet means) 3b for the screen 2b is set slightly higher at D11 (11 mm). As a result, the main output light from the higher screen 2a is converged much lower, and the main output light from the higher screen 2b is converged slightly higher. In this manner, the Fresnel conjugate point $k_2$ of the higher screen 2a shown in FIG. 1 is made coincident with the center S of audiences, and both the main output light beams from the screens 2a and 2b are converged to the center S of audiences. The "decenter" means a distance from a geometric center of a Fresnel sheet to an optical axis of the Fresnel lens.

Another method is disclosed, for example, in U.S. Pat. No. 4,919,518. As shown in FIGS. 4A, 4B, and 4C, a prism sheet means 5 is interposed between a Fresnel sheet means 3 and a lenticular sheet means 4 of each of the screens 2a and 2b. A prism angle $\theta_1$ of the prism sheet means for the higher screen 2a is set larger than a prism angle $\theta_2$ of the prism sheet means for the lower screen 2b. With the different prism angles, the main output light beams from the screens 2a and 2b are converged to the center S of audiences.

With the method illustrated in FIGS. 3A to 3C, it is necessary to set the decenter amount of the Fresnel lens of the higher Fresnel sheet means 3a to be much larger than the decenter amount of the Fresnel lens of the lower Fresnel sheet means 3b. For example, in the case of the unit module projector having a screen size of 70 inches shown in FIG. 1, a decenter amount D of the Fresnel lens of the Fresnel sheet means 3a required for the main output light from the higher screen 2a to be converged to the center S of audiences, is given by:

$$D = L * \tan S = 1740 * \tan 5.3 \approx 160 \text{ mm},$$

assuming that a projection distance L between the projection lens and screen is 1740 mm, and an inclination angle of the line interconnecting the projection lens and the center S of audiences is 5.3°.

In order to have a decenter amount of 160 mm of the Fresnel lens, a Fresnel sheet means having a size of 80 to 90 inches is cut along three cut lines shown in FIG. 5. A manufacturing apparatus for a Fresnel sheet means having a size of 80 to 90 inches becomes bulky and raises the cost.

Furthermore, the prism angles of the Fresnel lens of the Fresnel sheet means 3a become large at the upper right and left corners of the higher screen 2a because of too a large decent amount D of the Fresnel lens. Therefore, aberration is generated in red, blue, and green output light, changing colors and posing a problem of a difficulty in practical use.

With the method illustrated in FIGS. 4A to 4C, because of different prism angles, the prism sheet means 5 of the higher and lower screens 2a and 2b are required to be manufactured by using different metal molds which are expensive, raising the cost of a multi-screen projector even it has only two unit module projectors.

SUMMARY OF THE INVENTION

It is an object of the present invention to solve the above problems and provide a multi-screen projector capable of providing a uniform brightness of the whole screen, reducing color aberration, and providing a large screen size of high quality, without raising the cost.

In order to achieve the above object of the invention, a prism sheet means is interposed between a Fresnel sheet means and a lenticular sheet means of each unit module projector screen. The Fresnel sheet means and prism sheet means each can be manufactured by using only one type of metal molds, by regulating the angles of main output light beams of higher and lower two-stage Fresnel sheet means and prism sheet means and selecting a proper combination of polarities (main output light directions) of the higher and lower two-stage Fresnel sheet means and prism means.

The Fresnel sheet means and prism sheet means of the unit module projector and a projector position controlling means control the convergence point and direction of the main output light from each screen. Only one types of Fresnel sheet means and prism sheet means are used for converting the main output light to a target direction, by selecting one of the following fundamental combinations.

1) Higher and lower main output light beams are converged symmetrically by the Fresnel sheet means or by means for moving the projector unit upward or downward.

2) Higher and lower main output light beams are tilted in the same direction by the Fresnel sheet means or by means for moving the projector unit upward or downward.

3) Main output light is tilted and converged by the Fresnel sheet means or by means for moving the projector unit upward or downward. The prism sheet means tilts main light beams symmetrically upward and downward.

4) Both higher and lower main output light beams are tilted symmetrically by the Fresnel sheet means or by means for moving the projector unit upward or downward. The prism sheet means tilts and converges main output light.

Main output light can be converged to a target position such as the center of audiences. Therefore, an audience can visually sense no dark screen, no color aberration at the upper area of the screen, and no irregularity of brightness.

As shown in FIG. 4D, if a prism sheet is formed so as to generate diffused light beams B1, B2, and B3 from main output light, it becomes possible to control the diffusion characteristics of output light in the vertical direction.

BRIEF DESCRIPTION OF THE DRAWINGS

FIGS. 4A to 4D are a screen perspective view, a higher prism sheet cross sectional view, a lower prism sheet cross sectional view, and another prism sheet cross sectional view, respectively showing a conventional screen structure and prism sheet means.

FIG. 5 is a plan view of a Fresnel lens sheet explaining a method of forming the Fresnel lens sheet means shown in FIGS. 3A to 3C.

FIG. 6 is a schematic side view illustrating the convergence directions of main output light beams from a screen used by multi-screen projectors of the first to eighth embodiments of the invention.

FIG. 14 is a diagram explaining the operation of the prism sheet means of the third embodiment used by the screen of the embodiment of the invention shown in FIG. 6.

FIGS. 15A and 15B are a side view and a plan view, respectively showing an example of the prism sheet means shown in FIG. 14.

FIG. 16 is a diagram explaining the operation of the Fresnel sheet means of the fourth embodiment used by the screen of the embodiment of the invention shown in FIG. 6.

FIGS. 17A and 17B are a cross sectional view taken along line X—X and a plan view, respectively showing an example of the Fresnel sheet means shown in FIG. 16.

FIG. 20 is a diagram explaining the operation of the Fresnel sheet means of the fifth embodiment used by the screen of the embodiment of the invention shown in FIG. 6.

FIGS. 21A and 21B are a side view and a plan view, respectively showing an example of the prism sheet means shown in FIG. 20.

DETAILED DESCRIPTION OF THE PREFERRED EMBODIMENTS

Figure 1:
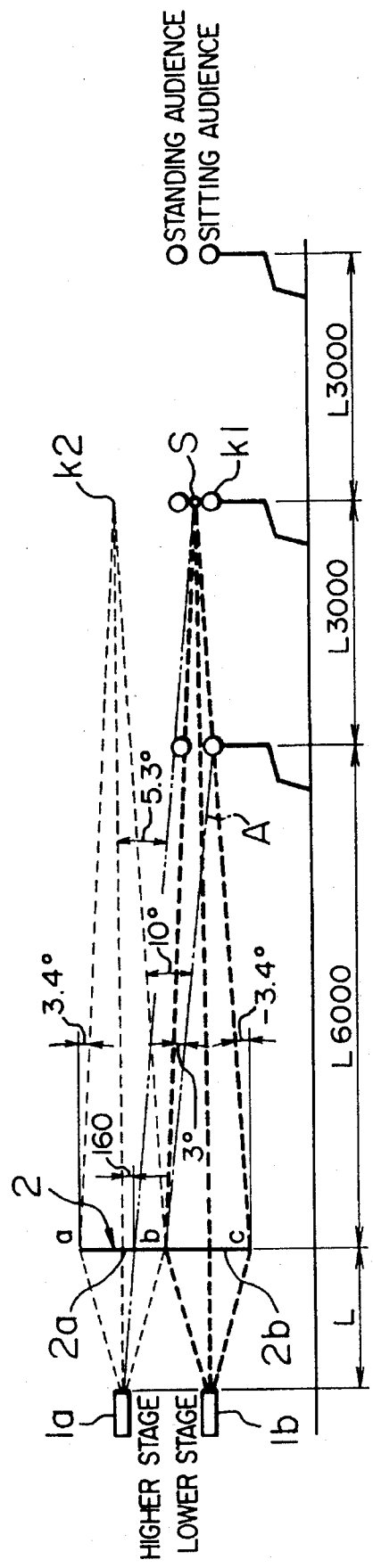
FIG. 1 is a schematic side view showing the structure of a conventional multi-screen projector.

Embodiments of the invention will be described with reference to the accompanying drawings.

FIG. 6 shows the convergence directions of main output light beams from a screen used by multi-screen projectors of the first to eighth embodiments of the invention. Like elements to those shown in FIGS. 1 and 2 are represented by using the identical reference numerals and characters.

Figure 2:
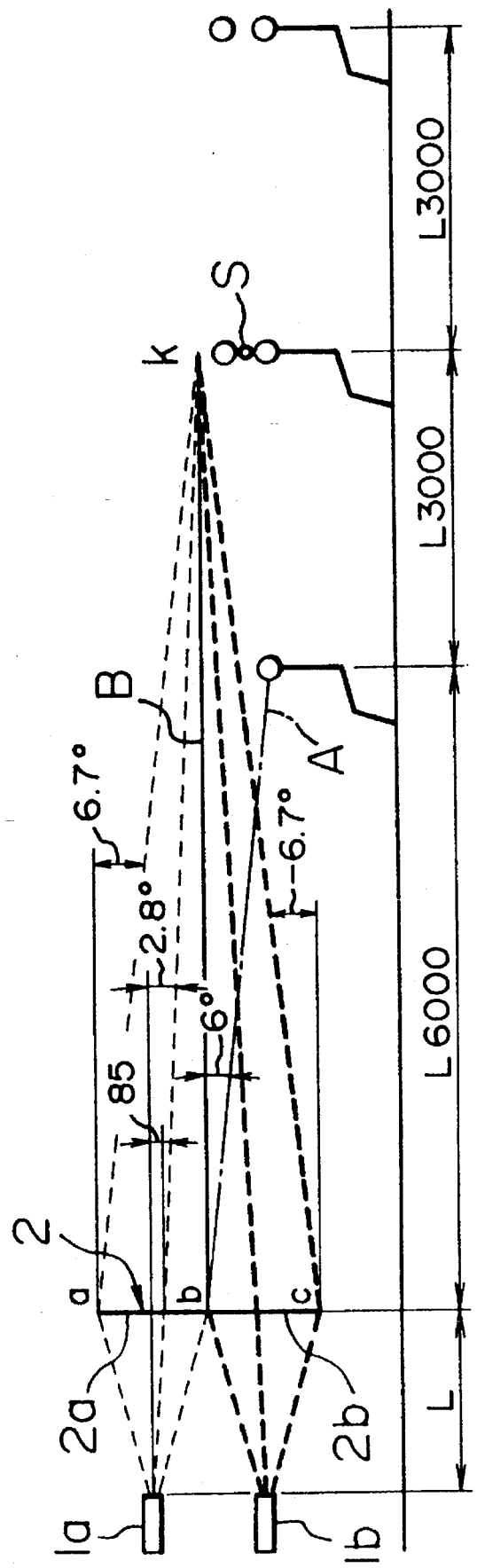
FIG. 2 is a schematic side view showing the structure of another conventional multi-screen projector.
Figures 3A, 3B, 3C:
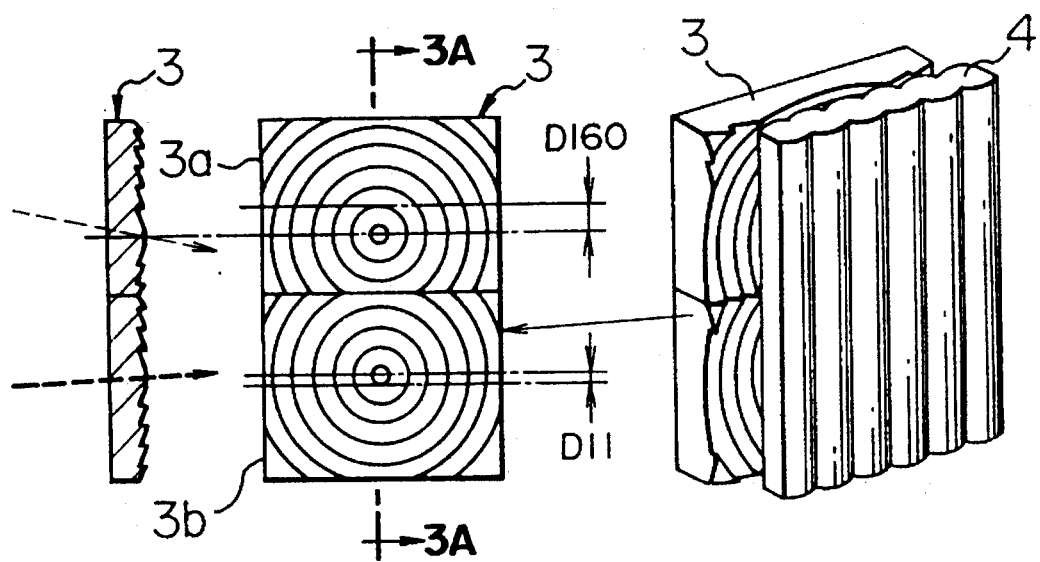
FIGS. 3A to 3C are a cross sectional view taken along line X—X, a plan view, and a perspective view, respectively showing the structure of a conventional Fresnel lens sheet means.

Similar to the multi-screen projectors shown in FIGS. 1 and 2, the multi-screen projector of this embodiment has two unit module projectors stacked one upon the other each having a screen size of 70 inches. The front and back rows of audiences are positioned remote from the screens 2a and 2b by 6 m (L6000) and 12 m (L6000+L3000+L3000). The center S of audiences is set at the middle point between the eyes of a standing audience and the eyes of a sitting audience at the middle row remote from the screens 2a and 2b by 9 m (L6000+L3000).

In this embodiment, both the main output light beams from the screens 2a and 2b converge to the center S of audiences. As a result, the main output light beams from the screens 2a and 2b are near at audiences, so that the audiences visually sense the whole multi-screen 2 of the screens 2a and 2b to be bright. The amount of main output light from the lower end b of the higher screen 2a is set substantially the same as that of the main output light from the upper end b of the lower screen 2b. Therefore, there is no brightness difference between the screens 2a and 2b, providing the uniform brightness of the whole multi-screen 2. In this manner, main output light from the screens 2a and 2b are effectively used.

Next, particular means for obtaining such main output light will be described with reference to the first to eighth embodiments.

The screens 2a and 2b shown in FIG. 6 each has a prism sheet means interposed between a Fresnel sheet means and a lenticular sheet means. FIG. 7 shows an example of the means of the first embodiment, wherein reference numeral 3 represents a Fresnel sheet means, reference numeral 3a represents a higher Fresnel sheet means, and reference numeral 3b represents a lower Fresnel sheet means.

Referring to FIG. 7, similar to the Fresnel sheet means shown in FIG. 2, a convergence point of main output light of each Fresnel sheet means 3a, 3b is an intersection between the parallel line B and a line perpendicular to the installation plane and passing through the center S of audiences. Therefore, each Fresnel sheet means 3a, 3b has a symmetrical shape relative to the interface of both the higher and lower Fresnel sheet means, and has the same decenter amount D85 (85 mm). Assuming that a projection distance L from the projector units 1a and 1b to the Fresnel sheet means 3a and 3b is 1740 mm and a tilt angle of the optical axes of the Fresnel sheet means 3a and 3b is 2.8° (refer to FIG. 2), the decenter amount D is given by:

$$D = 1740 * \tan 2.8° \approx 85 \text{ mm.}$$

As shown in FIG. 2, the angle of main output light from the higher Fresnel sheet means 3a is 6.7° at the upper end a and 0° at the lower end b, whereas the angle of main output light from the lower Fresnel sheet means 3b is 0° at the upper end b and −6.7° at the lower end c.

In order to converge both the main output light beams from the Fresnel sheet means 3a and 3b to the center S of audiences as shown in FIG. 6, the angles of main output light beams from the Fresnel sheet means 3a and 3b are required to be tilted downward further from the angles of main output light beams described with FIG. 2 by the amounts of:

main output light from the higher Fresnel sheet means 3a at the upper end a: 9.7°−6.7°=3.0°, main output light from the higher Fresnel sheet means 3a at the lower end b: 3.0°−0.0°=3.0°, main output light from the lower Fresnel sheet means 3b at the upper end b: 3.0°−0.0°=3.0°, and main output light from the lower Fresnel sheet means 3b at the lower end c: −3.7°−(−6.7°)=3.0°, because the angles of main output light beams at the end points a, b, and c shown in FIG. 6 are given by:

main output light from the higher Fresnel sheet means 3a at the upper end a: 9.7° main output light from the higher Fresnel sheet means 3a at the lower end b: 3.0° main output light from the lower Fresnel sheet means 3b at the upper end b: 3.0° and main output light from the lower Fresnel sheet means 3b at the lower end c: −3.7°.

This angle adjustment is performed by the prism sheet means.

Figure 8:
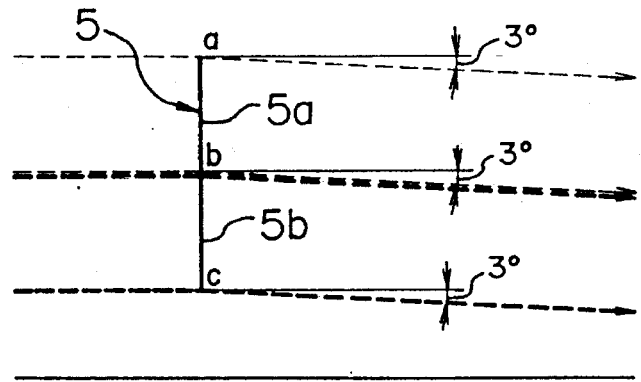
FIG. 8 is a diagram explaining the operation of the prism sheet means of the first embodiment used by the screen of the embodiment of the invention shown in FIG. 6.

FIG. 8 is a diagram explaining the operation of the prism sheet means 5. The prism sheet means 5 has a prism sheet means (higher prism sheet means) 5a on the higher screen 2a side and a prism sheet means (lower prism sheet means) 5b on the lower screen 2b side.

Figures 9A, 9B:
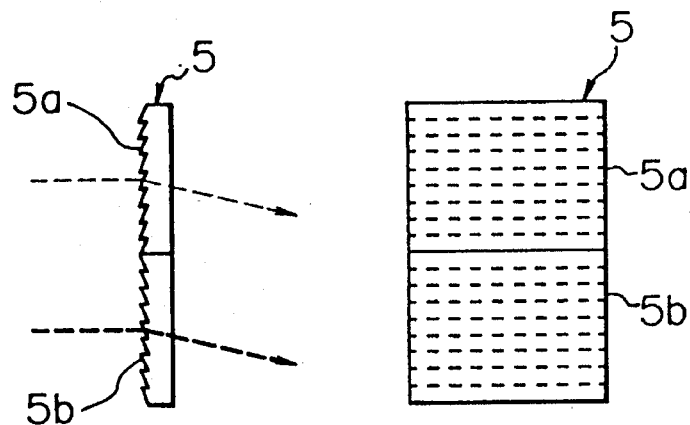
FIGS. 9A and 9B are a side view and a plan view, respectively showing an example of the prism sheet means shown in FIG. 8.

Referring to FIG. 8, the prism sheet means 5 tilts parallel incident light beams downward by 3° and outputs them in the form of parallel beams (in the infinite direction), respectively at the upper end a of the higher prism sheet means 5a, at the lower end b of the higher prism sheet means 5a (at the upper end b of the lower prism sheet means 5b), and at the lower end b of the lower prism sheet means 5b. To this end, as shown in FIGS. 9A and 9B, the prism lens surface of each prism sheet means 5a, 5b is shaped to be laterally long. In this case, since the angles of main output light beams are tilted by the same angle of 3° at any point of the prism sheet means 5, the shape of the prism lens surface can be made uniform over the whole surface of the prism sheet means 5.

Figures 7A, 7B:
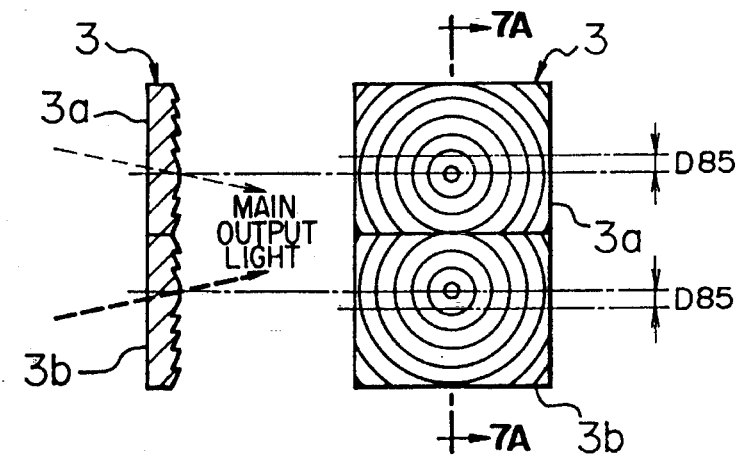
FIGS. 7A and 7B are a cross sectional view taken along line X—X and a plan view, respectively showing an example of the Fresnel lens sheet of the first embodiment used by the screen of the embodiment of the invention shown in FIG. 6.

The prism sheet means 5 is interposed between a Fresnel sheet means 3 shown in FIGS. 7A and 7B and a lenticular sheet means to form the screens 2a and 2b shown in FIG. 6. As shown in FIG. 6, main output light from the screens 2a and 2b can be converged substantially near to the center S of audiences.

The Fresnel sheet means 3a and 3b can therefore have a symmetrical shape relative to the interface therebetween. Accordingly, only one type of metal molds are required for the Fresnel sheet means 3a, 3b as well as the prism sheet means 5a, 5b.

Figure 10:
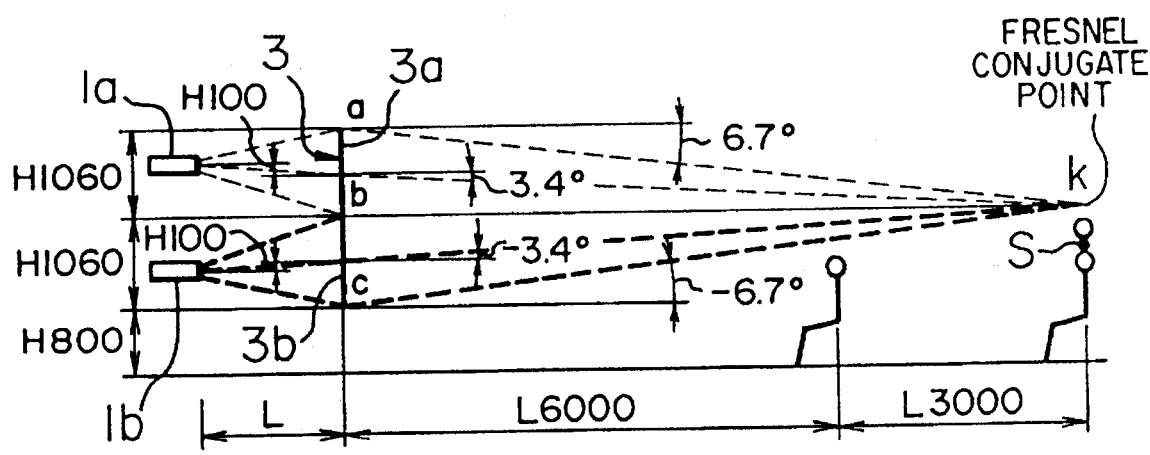
FIG. 10 is a diagram explaining the operation of the Fresnel sheet means of the second embodiment used by the screen of the embodiment of the invention shown in FIG. 6.

FIG. 10 is a diagram explaining the operation of the Fresnel sheet means of the second embodiment used by the multi-screen projector of the invention, without the prism sheet means. Like elements to those shown in the foregoing drawings are represented by using the identical reference numerals and characters.

Figures 11A, 11B:
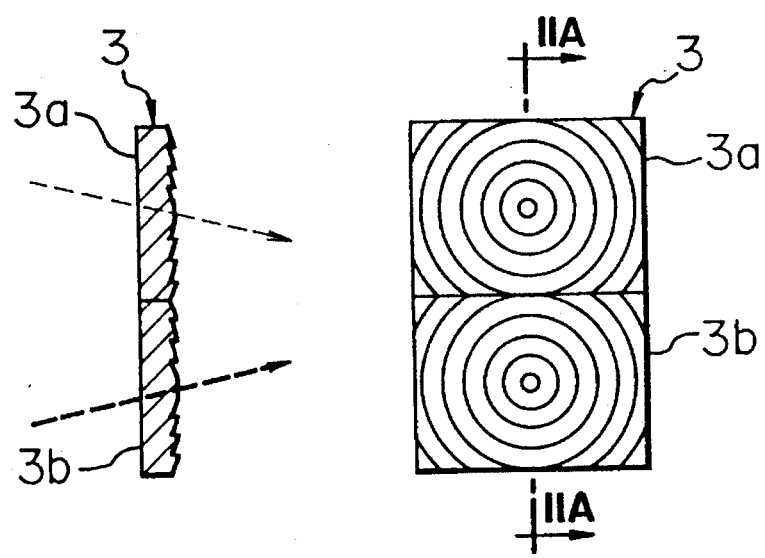
FIGS. 11A and 11B are a cross sectional view taken along line X—X and a plan view, respectively showing an example of the Fresnel sheet means shown in FIG. 10.

In FIG. 10, of the Fresnel sheet means 3, the Fresnel sheet means 3a and 3b are set to have a decenter amount of 0 mm as shown in FIGS. 11A and 11B. The optical axes of the Fresnel sheet means 3a and 3b are made coincide with the optical axes of the projection lenses of the projector units 1a and 1b. Similar to the multi-screen projector shown in FIG. 2, the convergence point of the main output light beams from the Fresnel sheet means 3a and 3b is set at the position different from the center S of audiences on a line perpendicular to the installation plane and passing through the center S of audiences.

In this embodiment, the higher projector unit 1a is moved upward and the lower projector unit 1b is moved downward, respectively in parallel with each other, the optical axis of the projection lens of the higher projector unit 1a and the optical axis of the upper Fresnel sheet means 3a are moved in parallel, and the optical axis of the projection lens of the lower projector unit 1b and the optical axis of the lower Fresnel sheet means 3b are moved in parallel. In this manner, as shown in FIGS. 10 and 11, light incident from the higher projector unit 1a is outputted from the higher Fresnel sheet means 3a to have an angle of the main output light therefrom being tilted downward, whereas light incident from the lower projector unit 1b is outputted from the lower Fresnel sheet means 3b to have an angle of the main output light therefrom being tilted upward. The main output light beams are therefore converged to the same point k near the center S of audiences on a line perpendicular to the installation plane and passing through the center S of audiences.

The displacement amounts H of the projector units 1a and 1b are equal and both have H100. Assuming that the projection distance L from the projection lens to the Fresnel sheet means 3a, 3b is 1740 mm and the inclination angle of the optical axis at the center of the Fresnel sheet means 3a, 3b is 3.4°, the displacement amount H is given by:

$$H = 1740 * \tan 3.4 \approx 100 \text{ mm}.$$

The angles of the main output light beams from the Fresnel sheet means 3 are 6.7° at the end point a, 0° at the end point b, and −6.7° at the end point c, which are the same as those of the multi-screen projector shown in FIG. 2. The Fresnel sheet means 3, the prism sheet means 5 described with FIGS. 9A and 9B, and a lenticular sheet means are combined to form the screen 2. With this screen 2, similar to the embodiments of the invention shown in FIG. 6, the main output light beams from the screens 2a and 2b can be converged near to the center S of audiences.

Accordingly, only one type of metal molds are required for the Fresnel sheet means 3 as well as the prism sheet means 5.

Figure 12:
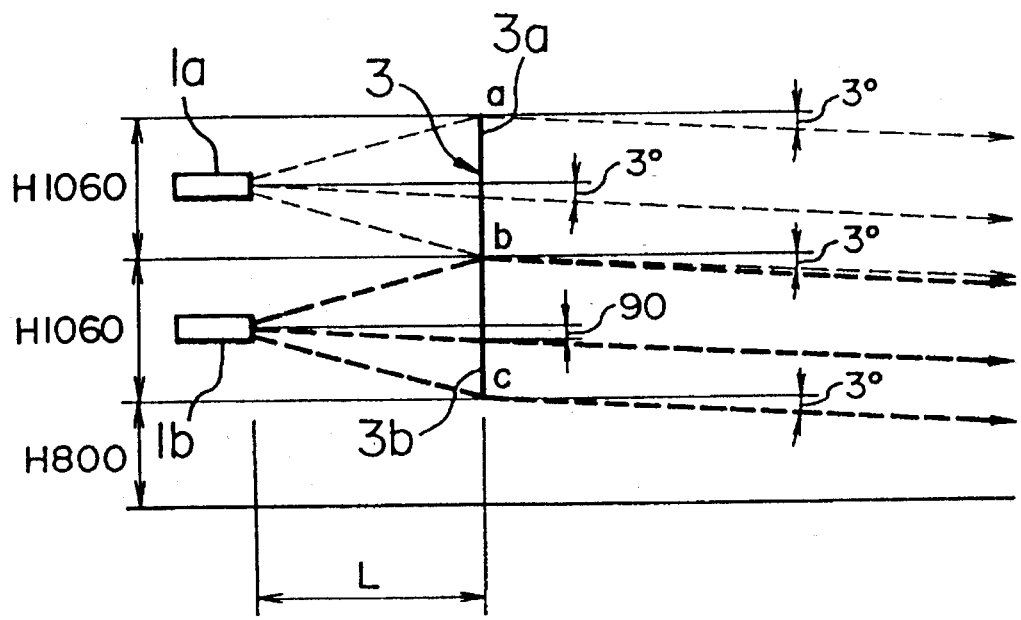
FIG. 12 is a diagram explaining the operation of the Fresnel sheet means of the third embodiment used by the screen of the embodiment of the invention shown in FIG. 6.

FIG. 12 is a diagram explaining the operation of the Fresnel sheet means of the third embodiment used by the multi-screen projector of the invention, without the prism sheet means. Like elements to those shown in the foregoing drawings are represented by using the identical reference numerals and characters. In FIG. 12, H1060 represents a height of 1060 mm of each of the higher and lower screens, and H800 represents a height of 800 mm of the lower screen from the installation plane.

In FIG. 12, the Fresnel sheet means 3 makes all the main output light beams to be parallel, and the angle of the main output light is tilted downward by only 3°. Specifically, the angles of main output light beams are tilted downward by 3°, respectively at the upper end a of the higher Fresnel sheet means 3a, at the lower end b of the higher Fresnel sheet means 3a (=at the upper end b of the lower Fresnel sheet means 3b), and at the lower end c of the lower Fresnel sheet means 3b.

Figures 13A, 13B:
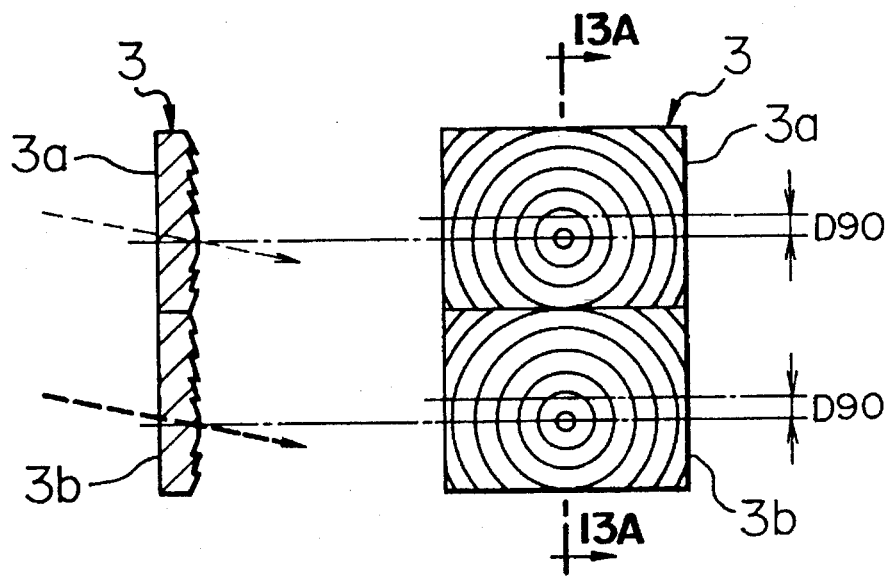
FIGS. 13A and 13B are a cross sectional view taken along line X—X and a plan view, respectively showing an example of the Fresnel sheet means shown in FIG. 12.

To this end, the Fresnel sheet means 3a and 3b are decentered downward by the same amount as shown in FIGS. 13A and 13B. Assuming that the projection distance L is 1740 mm and the inclination angle of the optical axes of the Fresnel sheet means 3a and 3b is 3°, the decenter amount D90 of the Fresnel sheet means 3a and 3b is given by:

$$D = 1740 * \tan 3 \approx 90 \text{ mm}.$$

In order to converge the main output light beams from the screens 2a and 2b to the center S of audiences as shown in FIG. 6 by using the Fresnel sheet means 3 described above, it is necessary to change the angles of the main output light beams from the Fresnel sheet means 3 at the end points a, b, and c by the amounts of:

main output light from the higher Fresnel sheet means 3a at the upper end a: 9.7°−3.0°=6.7°, main output light from the higher Fresnel sheet means 3a at the lower end b (=from the lower Fresnel sheet means 3b at the upper end b): 3.0°−3.0° =0.0° and main output light from the lower Fresnel sheet means 3b at the lower end c: 7.0°−3.0°=−6.7°.

The prism sheet means is used for this purpose.

FIG. 14 is a diagram explaining the operation of the prism sheet means 5. Parallel incident light to the higher prism sheet means 5a is changed to have an angle of the main output light tilted downward by a maximum amount of 6.5° at the upper end a and by a minimum amount of 0° at the lower end b. Parallel incident light to the lower prism sheet means 5b is changed to have an angle of the main output light tilted upward by a maximum amount of 6.5° at the lower end c and by a minimum amount of 0° at the upper end b.

As shown in FIGS. 15A and 15B, of the prism sheet means 5, the higher prism sheet means 5a is shaped to have a laterally long prism lens surface and the prism angles are gradually increased from the lower end b to the upper end a, whereas the lower prism sheet means 5b is shaped to have a laterally long prism lens surface and the prism angles are gradually increased from the upper end b to the lower end c. At the interface between the prism sheet means 5a and 5b, the laterally long prism lens surfaces are inclined in the opposite directions.

The prism sheet means 5 described above, the Fresnel sheet means 3 shown in FIGS. 13A and 13B, and a lenticular sheet means are combined to form the screen 2. With this screen 2, similar to the embodiment of the invention shown in FIG. 6, the main output light beams from the screens 2a and 2b can be converged near to the center S of audiences.

Accordingly, the higher and lower prism sheet means can be shaped symmetrically, and only one type of metal molds are required for the Fresnel sheet means 3 as well as the prism sheet means 5.

FIG. 16 is a diagram explaining the operation of the Fresnel sheet means of the fourth embodiment used by the multi-screen projector of the invention, without the prism sheet means. Like elements to those shown in the foregoing drawings are represented by using the identical reference numerals and characters.

In FIG. 16, the higher and lower Fresnel sheet means 3a and 3b of the Fresnel sheet means 3 of this embodiment are set to have the same decenter amount D of 0 mm as shown in FIG. 17B, the projector units 1a and 1b are displaced upward by H90, and the optical axes of these projection lenses are displaced from the optical axes of the Fresnel sheet means 3a and 3b. Specifically, the main output light beams are changed to downward parallel light, respectively at the upper end a of the higher Fresnel sheet means 3a, at the lower end b of the higher Fresnel sheet means 3a (=at the upper end b of the lower Fresnel sheet means 3b), and at the lower end c of the lower Fresnel sheet means 3b. The downward angle is set to the same angle of 3°. Assuming that the projection distance L is 1740 mm and the inclination angle of the optical axes at the centers of the Fresnel sheet means 3a and 3b is 3°, the displacement amount H90 of the projector units 1a and 1b is given by:

$$H = 1740 * \tan 3 \approx 90 \text{ mm}.$$

The angle of 3° of the main output light at the end points a, b, and c of the Fresnel sheet means 3 is the same as FIG. 12. Therefore, by interposing the prism sheet means 5 described with FIGS. 14, 15A between the Fresnel sheet means 3 and a lenticular sheet means, the main output light beams from the screens 2a and 2b can be converged near to the center S of audiences, similar to the embodiment of the invention shown in FIG. 6.

Accordingly, the higher and lower prism sheet means can be shaped symmetrically, and only one type of metal molds are required for the Fresnel sheet means 3 as well as the prism sheet means 5.

Figure 18:
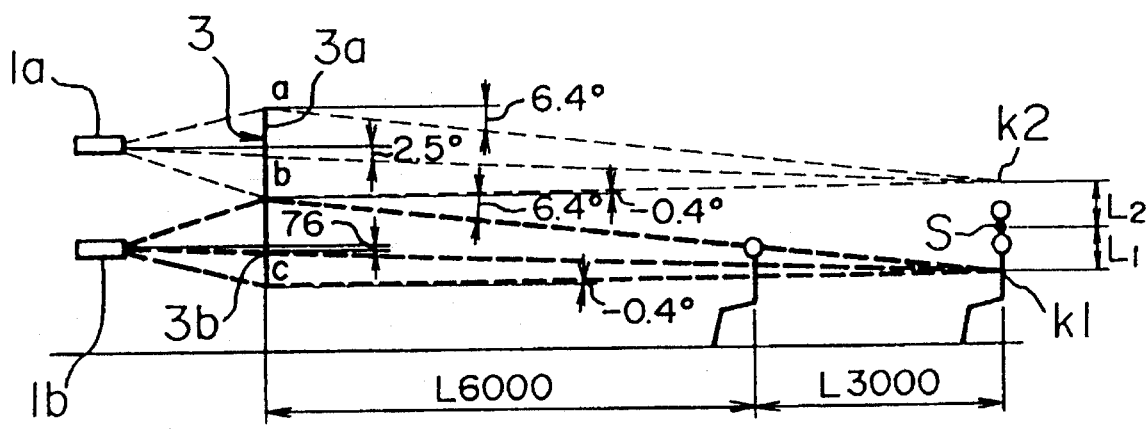
FIG. 18 is a diagram explaining the operation of the Fresnel sheet means of the fifth embodiment used by the screen of the embodiment of the invention shown in FIG. 6.

FIG. 18 is a diagram explaining the operation of the Fresnel sheet means of the fifth embodiment used by the multi-screen projector of the invention, without the prism sheet means. Like elements to those shown in the foregoing drawings are represented by using the identical reference numerals and characters.

In FIG. 18, of the Fresnel sheet means 3 of this embodiment, the convergence point (conjugate point) $k_2$ of the main output light from the higher Fresnel sheet means 3a is set at a different position from the convergence point (conjugate point) $k_1$ of the main output light from the lower Fresnel sheet means 3b. The convergence points $k_1$ and $k_2$ are set near the center S of audiences on a line perpendicular to the installation plane and passing through the center S of audiences. Specifically, the convergence point $k_1$ is set lower than the center S of audiences by a distance $L_1$, whereas the convergence point $k_2$ is set higher than the center S of audiences by a distance $L_2$. A distance $L_1 + L_2$ is equal to the vertical height of the Fresnel sheet means 3a, 3b, and it is set to be $L_1 = L_2$.

Figures 19A, 19B:
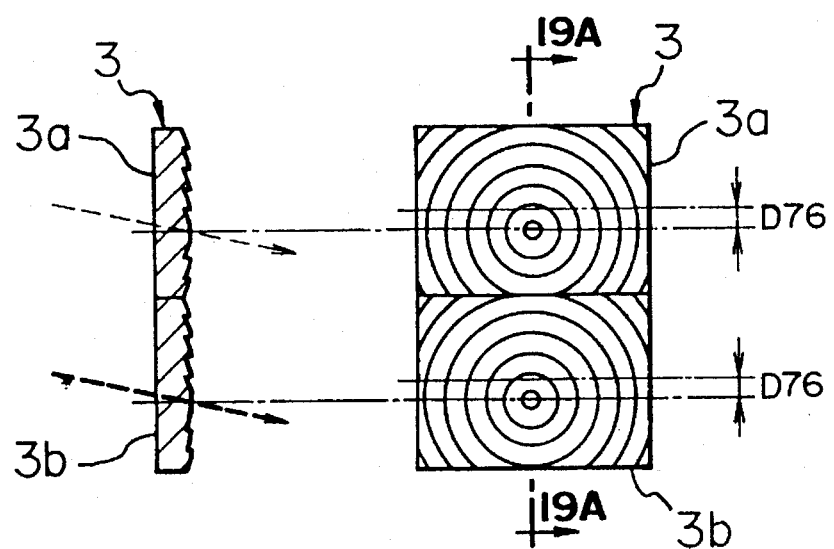
FIGS. 19A and 19B are a cross sectional view taken along line X—X and a plan view, respectively showing an example of the Fresnel sheet means shown in FIG. 18.

As shown in FIGS. 19A and 19B, the Fresnel lenses of the Fresnel sheet means 3a and 3b of the Fresnel sheet means 3 are decentered downward by the same amount. Assuming that the projection distance L is 1740 mm and the inclination angle of the optical axes at the centers of the Fresnel sheet means 3a and 3b is 2.5°, the decenter amount D76 of the Fresnel sheet means 3a and 3b is given by:

$$D = 1740 * \tan 2.5 \approx 76 \text{ mm}.$$

The angles of the main output light beams are 6.4° and −0.4° respectively at the upper and lower ends a and b of the higher Fresnel sheet means 3a, whereas the angles of the main output light beams are 6.4° and −0.4° respectively at the upper and lower ends b and c of the lower Fresnel sheet means 3b.

In order to converge the main output light beams from Fresnel sheet means 3 as shown in FIG. 6, it is necessary to change the angles of the main output light beams from the Fresnel sheet means 3 at the end points a, b, and c by the amounts of:

main output light from the higher Fresnel sheet means 3a at the upper end a: 9.7°−6.4°=3.3° main output light from the higher Fresnel sheet means 3a at the lower end b: 3.0°−(−0.4°)= 3.4°, main output light from the lower Fresnel sheet means 3b at the upper end b: 3.0°−6.4°=−3.4° and main output light from the lower Fresnel sheet means 3b at the lower end c: −3.7°−(−0.4°)=−3.3.

As illustrated in FIG. 20, the prism sheet means 5 is used for outputting incident light having the above-described angles.

FIGS. 21A and 21B show an example of the prism sheet means having the function described above. The angles of the laterally long prism lens surface of the higher prism sheet means 5a are gradually changed from the upper end A to the lower end b so as to make parallel incident light thereto have the angles of main output light changing from 3.3° to 3.4°. Conversely, the angles of the laterally long prism lens surface of the lower prism sheet means 5b are gradually changed from the lower end c to the upper end b so as to make parallel incident light thereto have the angles of main output light changing from 3.3° to 3.4°.

In this embodiment, the prism sheet means explained with FIGS. 20, 21A, and 21B is interposed between the Fresnel sheet means 3 explained with FIGS. 18, 19A, and 19B and a lenticular sheet means to form the screen 2. Similar to the embodiment of the invention shown in FIG. 6, the main output light beams from the screens 2a and 2b can be converged near to the center S of audience.

Accordingly, only one type of metal molds are required for the Fresnel sheet means 3 as well as the prism sheet means 5.

Figure 22:
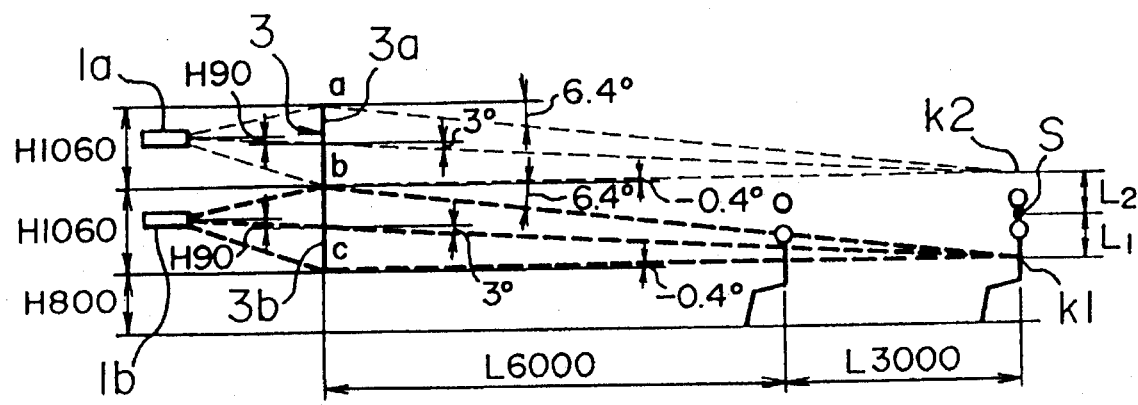
FIG. 22 is a diagram explaining the operation of the Fresnel sheet means of the sixth embodiment used by the screen of the embodiment of the invention shown in FIG. 6.

FIG. 22 is a diagram explaining the operation of the Fresnel sheet means of the sixth embodiment used by the multi-screen projector of the invention, without the prism sheet means. Like elements to those shown in the foregoing drawings are represented by using the identical reference numerals and characters.

Figure 23A:
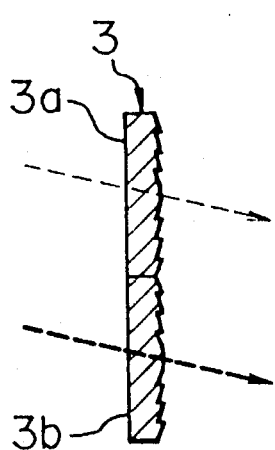
FIGS. 23A and 23B are a cross sectional view taken along line X—X and a plan view, respectively showing an example of the Fresnel sheet means shown in FIG. 22.
Figure 23B:
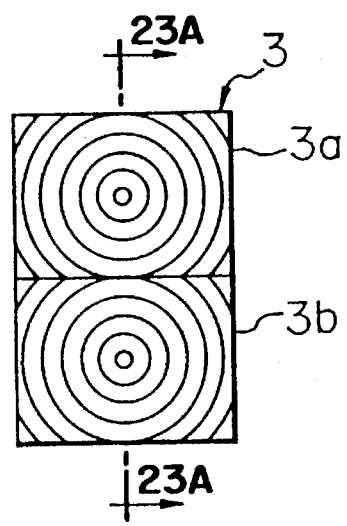

In FIG. 22, the decenter amounts D of the Fresnel lenses of the Fresnel sheet means $3a$ and $3b$ of the Fresnel sheet means 3 of this embodiment are set to 0 mm as shown in FIGS. 23A and 23B, the projector units $1a$ and $1b$ are displaced upward by H90 to displace the optical axes of the projection lenses from the optical axes of the Fresnel sheet means $3a$ and $3b$, and the main output light beams from the Fresnel sheet means $3a$ and $3b$ are converged to the convergence points $k_1$ and $k_2$ similar to the case of FIG. 18. Assuming that the projection distance L is 1740 mm and the inclination angle of the optical axes at the centers of the Fresnel sheet means $3a$ and $3b$ is 3°, the displacement amount of the projector units $1a$ and $1b$ is given by:

H=1740 * tan 3≈90 mm.

The angles of the main output light beams are 6.4° and −0.4° respectively at the upper and lower ends a and b of the higher Fresnel sheet means $3a$, whereas the angles of the main output light beams are 6.4° and −0.4° respectively at the upper and lower ends b and c of the lower Fresnel sheet means $3b$. These angles are the same as those shown in FIG. 18. Accordingly, by interposing the prism sheet means 5 described with FIGS. 20, 21A, and 21B between the Fresnel sheet means 3 and a lenticular sheet means to form the screen 2, the main output light beams from the screens $2a$ and $2b$ can be converged near to the center S of audiences, similar to the embodiment of the invention shown in FIG. 6.

Accordingly, only one type of metal molds are required for the Fresnel sheet means 3 as well as the prism sheet means 5.

Figure 24:
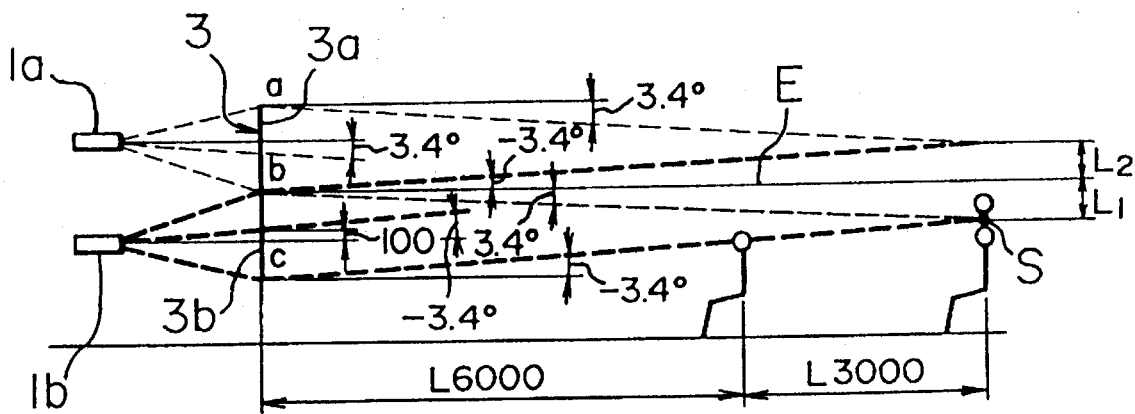
FIG. 24 is a diagram explaining the operation of the Fresnel sheet means of the seventh embodiment used by the screen of the embodiment of the invention shown in FIG. 6.

FIG. 24 is a diagram explaining the operation of the Fresnel sheet means of the seventh embodiment used by the multi-screen projector of the invention, without the prism sheet means. Like elements to those shown in the foregoing drawings are represented by using the identical reference numerals and characters.

In FIG. 24, a line in parallel with the installation plane and passing through the interface between the Fresnel sheet means $3a$ and $3b$, is represented by E. The Fresnel sheet means $3a$ and $3b$ are configured in the following manner. The main output light from the higher Fresnel sheet means $3a$ at the upper end a intersects with the main output light from the lower Fresnel sheet means $3b$ at the upper end b at the position higher than the intersection between the parallel line E and a line perpendicular to the installation plane and passing through the center S of audiences, by $L_2$. The main output light from the higher Fresnel sheet means $3a$ at the lower end b intersects with the main output light from the lower Fresnel sheet means $3b$ at the lower end c at the position lower than the intersection between the parallel line E and the line perpendicular to the installation plane and passing through the center S of audiences, by $L_1$. It is set to be $L_1=L_2$. A distance of $L_1+L_2$ is set to be equal to a height of each Fresnel sheet means $3a$, $3b$.

The main output light beams from the higher Fresnel sheet means $3a$ are parallel light tilted downward by 3.4°, and the main output light beams from the lower Fresnel sheet means $3b$ are parallel light tilted upward by 3.4°.

Figures 25A, 25B:
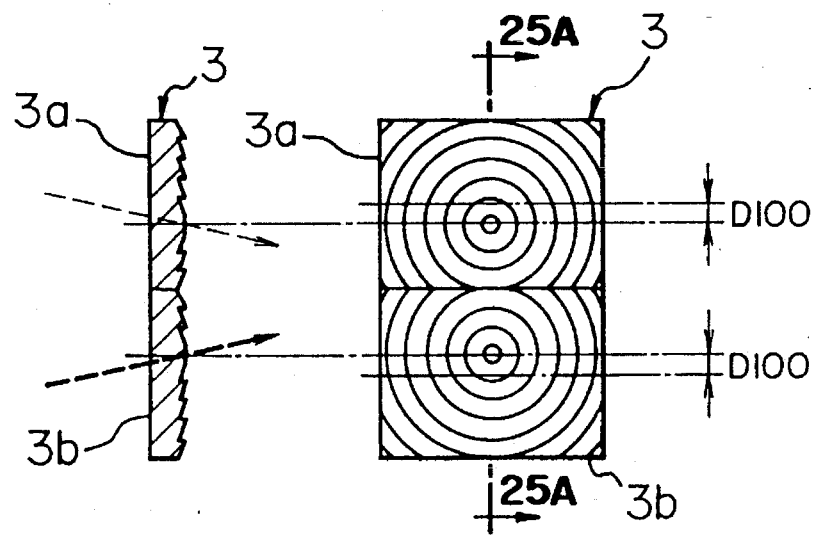
FIGS. 25A and 25B are a cross sectional view taken along line X—X and a plan view, respectively showing an example of the Fresnel sheet means shown in FIG. 24.

As shown in FIGS. 25A and 25B, of the Fresnel sheet means 3, the Fresnel lens of the higher Fresnel sheet means $3a$ is decentered downward by D100, and the Fresnel lens of the lower Fresnel sheet member $3b$ is decentered upward by D100. Assuming that the projection distance L is 1740 mm and the inclination angle of the optical axes of the Fresnel sheet means $3a$ and $3b$ is 3.4°, the decenter amount D100 is given by:

D=1740 * tan 3.4≈100 mm.

In order to obtain the main output light beams from the Fresnel sheet means 3 like those shown in FIG. 6, because the angle between the parallel line extending from the end point b and a line interconnecting the end point b and the center S of audiences is 3.0° as shown in FIG. 6, it is necessary to further tilt upward the angle of the main output light from the higher Fresnel sheet means $3a$ shown in FIG. 24 by the amount of 3.4°−3.0° =0.4° and to further tilt downward the angle of the main output light from the lower Fresnel sheet means $3b$ by the amount of 3.0°+3.4°=6.4°. In this manner, the main output light from the higher Fresnel sheet means $3a$ at the lower end b and the main output light from the lower Fresnel sheet means $3b$ at the upper end b are allowed to pass near the center S of audiences, similar to the embodiment of the invention shown in FIG. 6. To this end, the prism sheet means shown in FIGS. 26, 27A and 27B is used.

Figure 26:
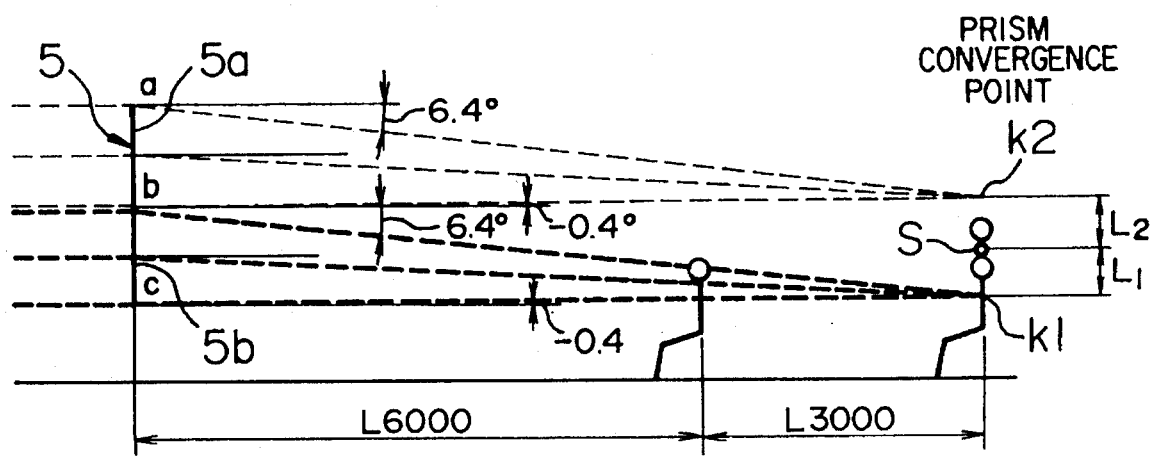
FIG. 26 is a diagram explaining the operation of the prism sheet means of the seventh embodiment used by the screen of the embodiment of the invention shown in FIG. 6.

FIG. 26 is a diagram explaining the operation of the prism sheet means 5 with parallel incident light. Of the prism sheet means 5, the higher prism sheet means $5a$ is set so that the angle of the main output light is tilted downward by an angle of 6.4° at the upper end a and tilted upward by an angle of 0.4° at the lower end b and that the main output light converges to the convergence point $K_2$ which is higher than the center S of audiences near on a line perpendicular to the installation plane and passing through the center S of audiences, by $L_2$. The lower prism sheet means $5b$ is set so that the angle of the main output light is tilted downward by an angle of 6.4° at the upper end b and tilted upward by an angle of −0.4° at the lower end c and that the main output light converges to the convergence point $K_1$ which is lower than the center S of audiences near on a line perpendicular to the installation plane and passing through the center S of audiences, by $L_1$.

Figures 27A, 27B:
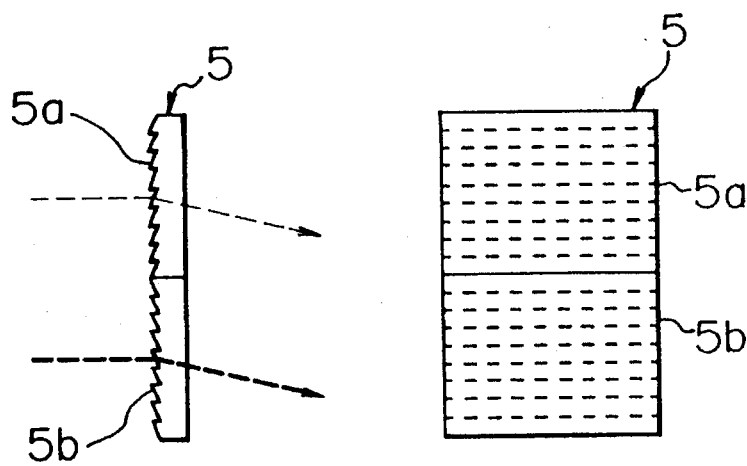
FIGS. 27A and 27B are a side view and a plan view, respectively showing an example of the prism sheet means shown in FIG. 26.

As shown in FIGS. 27A and 27B, the shapes of the prism sheet means $5a$ and $5b$ of the prism sheet means 5 are made equal, and the inclination angles of the laterally long prism lens surface are gradually reduced from the upper end to the lower end.

The prism sheet means 5 described with FIGS. 26, 27A, and 27B, the Fresnel sheet means 3 described with FIGS. 24, 25A, and 25B, and a lenticular sheet means are combined like shown in FIGS. 4A to 4D to form the screen 2. The angles of the main output light beams from the screen 2 are given by:

main output light from the higher screen $2a$ at the upper end a: 3.4°+6.4°=9.8°, main output light from the upper screen $2a$ at the lower end b: 3.4°+(−0.4°)=3.0°, main output light from the lower screen $2b$ at the upper end b: −3.4+6.4=3.0°, and main output light from the lower screen $2b$ at the lower end c: −3.4°+(−0.4°)=−3.8°.

These angles are substantially the same as those of the embodiment of the invention shown in FIG. 6. Therefore, the main output light beams from the screens $2a$ and $2b$ can converge near to the center S of audiences.

Accordingly, only one type of metal molds are required for the Fresnel sheet means 3 as well as the prism sheet means 5.

Figure 28:
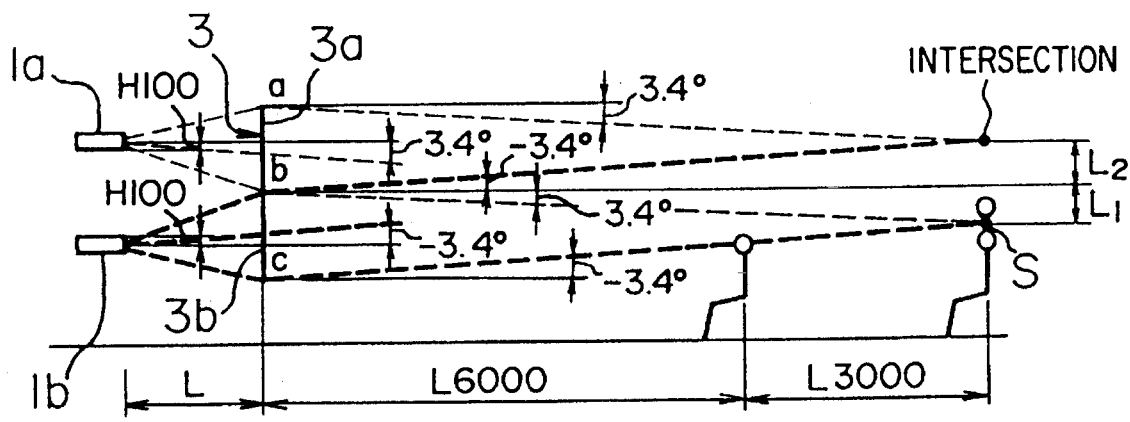
FIG. 28 is a diagram explaining the operation of the Fresnel sheet means of the eighth embodiment used by the screen of the embodiment of the invention shown in FIG. 6.

FIG. 28 is a diagram explaining the operation of the

Fresnel sheet means of the eighth embodiment used by the multi-screen projector of the invention, without the prism sheet means. Like elements to those shown in the foregoing drawings are represented by using the identical reference numerals and characters.

Figures 29A, 29B:
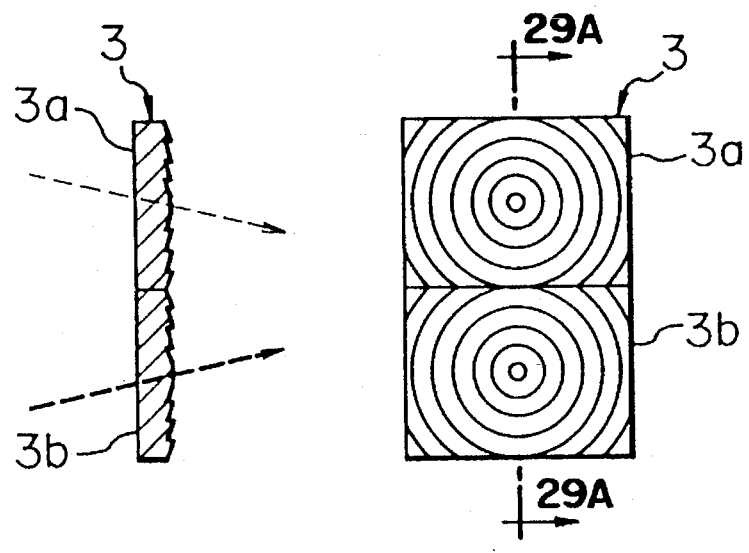
FIGS. 29A and 29B are a cross sectional view taken along line X—X and a plan view, respectively showing an example of the Fresnel sheet means shown in FIG. 28.

In FIG. 28, the decenter amount of the Fresnel lenses of the Fresnel sheet means 3a and 3b of this embodiment is set to be 0 mm as shown in FIGS. 29A and 29B, and the higher projector unit 1a is displaced upward and the lower projector unit 1b is displaced downward, respectively in parallel with each other, so that incident light beams to the projector units 1a and 1b are outputted as parallel light beams (in the infinite direction) like those shown in FIG. 24.

Similar to those shown in FIG. 24, the main output light of the higher Fresnel sheet means 3a is tilted downward by 3.4°, and the main output light of the lower Fresnel sheet means 3b is tilted upward by 3.4°. Assuming that the projection distance L is 1740 mm and the inclination angle of the Fresnel lenses of the Fresnel sheet means 3a and 3b is 3.4°, the displacement amount H100 of the projector units 1a and 1b is given by:

H=1740 * tan 3.4≈100 mm.

The angles of the main output light beams from the Fresnel sheet means 2 are the same as the embodiments described with FIGS. 24 to 27. Therefore, by combining the Fresnel sheet means 3 shown in FIGS. 28, 29A, and 29B, the prism sheet means 5 shown in FIGS. 26, 27A, and 27B, and a lenticular sheet means to form the screen 2 in the manner like shown in FIGS. 4A to 4D, the main output light from the screens 2a and 2b can converge near to the center S of audiences, similar to the embodiment of the invention shown in FIG. 6.

Accordingly, only one type of metal molds are required for the Fresnel sheet means 3 as well as the prism sheet means 5.

Figure 30:
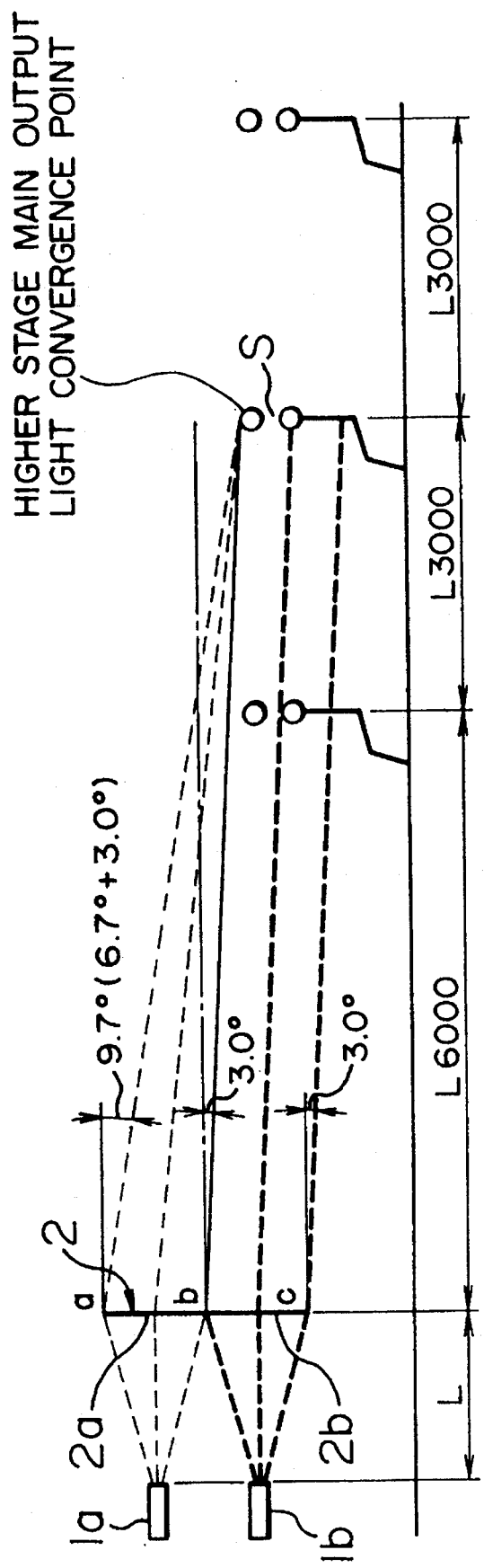
FIG. 30 is a schematic side view illustrating the convergence directions of main output light beams from a screen used by a multi-screen projector of the ninth embodiment of the invention.

FIG. 30 is a schematic side view illustrating the convergence directions of main output light beams from a screen used by a multi-screen projector of the ninth embodiment of the invention. Like elements to those shown in the foregoing drawings are represented by using the identical reference numerals and characters.

In FIG. 30, the angles of the main output light beams from the higher screen 2a at the lower end b and from the lower screen 2b at the upper end b are tilted downward by 3.0°. The main output light beams from the lower screen 2b are made parallel light. The main output light beams from the higher screen 22a are converged substantially near on a line perpendicular to the installation plane and passing through the center S of audiences.

To this end, in the ninth embodiment, the Fresnel sheet means 3 having the structure shown FIGS. 12, 13A, and 13B or the Fresnel sheet means 3 having the structure shown in FIGS. 16, 17A, and 17B is used. The prism sheet means 5 having the structure shown in FIGS. 14, 15A, and 15B is used as the higher prism sheet means, and a prism sheet means made of a transparent parallel plate is used in place of the lower prism sheet means 5b.

The tenth embodiment of the multi-screen projector of the invention will be described.

The tenth embodiment has a modified structure of that shown in FIG. 6. In FIG. 6, the angles of the main output light beams from the higher screen 2a at the lower end b and from the lower screen 2b at the lower end b are tilted, for example, by 6.4° and the main output light beams from the higher and lower screens 2a and 2b are made converged light. The main output light beams from the higher and lower screens 2a are converged, for example, near to the convergence point $k_1$ described with FIG. 18.

For this structure of the tenth embodiment, if the Fresnel sheet means 3 having the structure shown in FIGS. 18, 19A, and 19B or the Fresnel sheet means 3 having the structure shown in FIGS. 22, 23A, and 23B is used, the angle of the main output light from the higher Fresnel sheet means 3a at the lower end b is tilted downward by 0.4°+6.4°=6.8°. To this end, in the tenth embodiment, the higher prism sheet means 5a is set to have the angles of the main output light beams tilted at the upper and lower ends thereof by about 6.8° and to output parallel light, similar to the prism sheet means 5s having the structure shown in FIGS. 20, 21A, and 21B, and a prism sheet means made of a transparent parallel plate is used in place of the lower prism sheet means 5b.

Also in this embodiment, the angles of the main output light beams from the higher screen 2a at the lower end b and from the lower screen 2b at the upper end b are equal so that there is no brightness difference between the screens 2a and 2b. Accordingly, only one type of metal molds are required for the Fresnel sheet means 3 as well as the prism sheet means 5.

Figure 31:
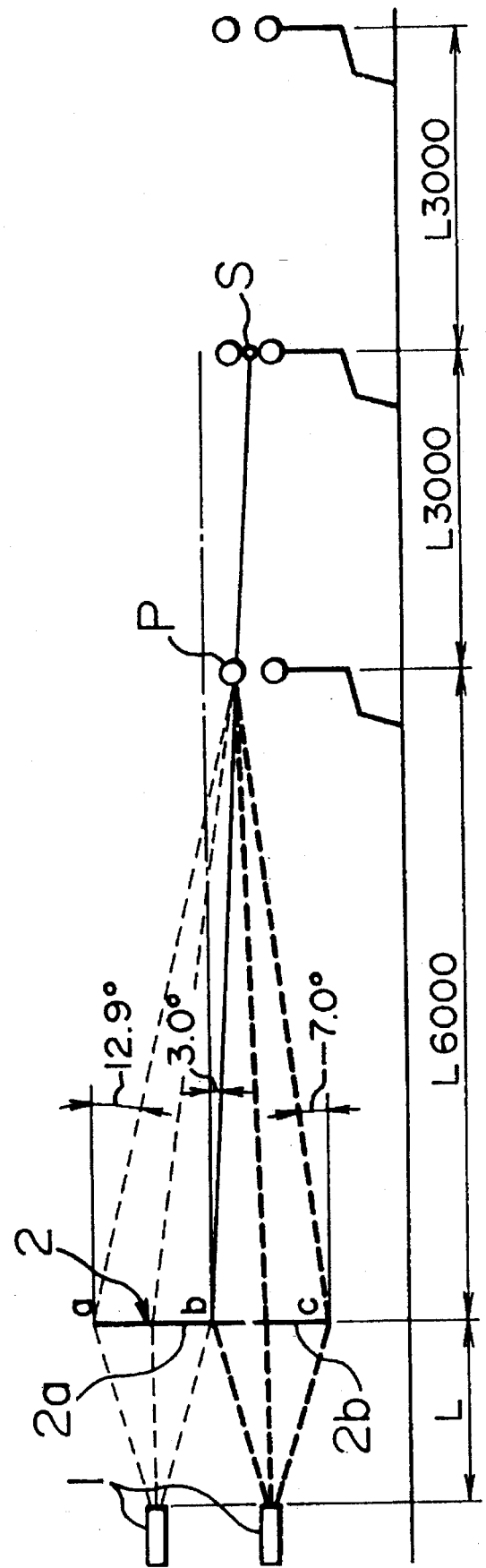
FIG. 31 is a schematic side view illustrating the convergence directions of main output light beams from a screen used by a multi-screen projector of the tenth embodiment of the invention.

FIG. 31 is a schematic side view illustrating the convergence directions of main output light beams from a screen used by a multi-screen projector of the tenth embodiment of the invention. Like elements to those shown in the foregoing drawings are represented by using the identical reference numerals and characters, and the detailed description thereof is omitted.

In FIG. 31, the convergence point of the main output light is set to a main output light convergence point P which is set, for example, nearer to the screen 2 on a line interconnecting the point b of the screen 2 and the center S of audiences. In order to converge the main output light substantially to the point P near to the screen 2, the following combination may be used. The Fresnel sheet means 3 having the structure of the fifth embodiment shown in FIG. 18 is used. Of the prism sheet means 5 having the structure of the fifth embodiment shown in FIG. 20, the higher prism means 5a is used whose angle of the main output light at the lower end thereof is unchanged and is about 3.4° and whose angle of the main output light at the upper end thereof is changed from 3.3° to about 6.5°. In the latter case, the angle of about 6.5° is added to the angle of 6.4° of the main output light from the higher Fresnel sheet means 3a shown in FIG. 18 at the upper end a thereof so that the angle at the upper end a of the higher screen 2a shown in FIG. 31 becomes about 12.9°. As the lower prism sheet means 5b, the higher prism sheet means turned upside down is used. In this case, the angle of 0.4° at the lower end c of the lower Fresnel sheet means 3b shown in FIG. 18 is added to provide a total angle of 6.9°. The main output light beams from both the higher and lower prism sheet means 5a and 5b are converged in the manner described above, to thereby converge the main output light beams substantially to the point P.

Conversely, if the convergence point is set farther from the screen 2, of the prism sheet means 5 having the structure shown in FIG. 20, the higher prism sheet means 5a is used whose angle of the main output light at the upper end thereof is made smaller than about 3.3°, and as the lower prism sheet means, the higher prism means turned upside down is used. The main output light beams from both the higher and lower prism sheet means 5a and 5b are diverged, to thereby set the main output light convergence point farther from the screen.

In the first, third, fifth, seventh, ninth, and tenth embodiments, if a small difference of angle and brightness of the main output light is generated between the lower end b of the higher screen 2a and the upper end b of the lower screen 2b, because of a calculation error or dimension tolerance of the Fresnel sheet means, such a small brightness difference caused by the main output light angle difference between the higher and lower screens 2a and 2b can be corrected by moving the projector units 1a and 1b slightly upward or downward in the manner described with the second, fourth, sixth, and eighth embodiments.

In the first to eighth embodiments of the invention, the prism lens surface of the prism sheet means 5 may be made to have a number of partial surfaces such as shown in FIG. 4D so that the main output light can be diverged upward and downward.

Specifically, the prism sheet means shown in FIG. 4D has small surfaces S1 and S2 at the upper and lower corners of the prism lens surface. Incident light is therefore outputted from the prism output surface as diverged beams B1, B2, and B3. By outputting diverged beams from the prism sheet means, it becomes possible to control the divergence characteristics in the vertical direction, thereby making the object of the invention more effectively.

In the above embodiments, the main output light beams are converged to the center S of audiences. The invention is not limited to this, but the main output light beams can be converged to any desired position determined from the screen size and the positions of all audiences, by using only one types of the Fresnel sheet means 3 and prism sheet means 5.

As described so far, in the multi-screen projector made of unit module projectors disposed at the higher and lower two stages and at right and left n-columns, as a means for converging the main output light beams from the screen to an ideal target direction, the Fresnel sheet means of the same type having the same decenter amount and the prism sheet means of the same type having the same prism angle can be used for the screen made of higher and lower unit module projectors. Accordingly, each of the Fresnel sheet means and the prism sheet means can be formed by using the same type of metal molds, thereby reducing the costs of the Fresnel sheet means and prism sheet means and reducing the total cost of the multi-screen projector.

Furthermore, the decenter amount of the Fresnel sheet means can be made small so that a color change at the upper corners of the higher screen can be made not conspicuous.

Still further, it is possible to make the angles of the main output light beams at the lower end of the higher screen and at the upper end of the lower screen be substantially the same, and to eliminate a brightness difference between the higher and lower screens by controlling the positions of the higher and lower projector units to correct the angle and brightness difference of the main output light beams between the higher and lower screens. Still furthermore, since the main output light beam is directed to audiences, the main output light can be effectively used to brighten the whole area of the screen.

What is claimed is:

1. A multi-screen projector having unit module projectors stacked at two higher and lower stages in the vertical direction, each unit module projector having a screen with a Fresnel sheet means disposed on an input side thereof and with a lenticular sheet means disposed on the output side thereof, the multi-screen projector comprising:

a prism sheet means interposed between said Fresnel sheet means and said lenticular sheet means of each said screen, wherein a higher stage Fresnel sheet means of said Fresnel sheet means of said screen for a higher stage unit module projector and a lower stage Fresnel sheet means of said Fresnel sheet means of said screen for a lower stage unit module projector, are formed to have substantially the same shape;

a higher stage prism sheet means of said prism sheet means of said screen for a higher stage unit module projector and a lower stage prism sheet means of said prism sheet means of said screen for a lower stage unit module projector, are formed to have substantially the same shape; and the direction of the main output light from the lower end of said screen for a higher stage unit module projector and the direction of the main output light from the upper end of said screen for a lower stage unit module projector, are set to be substantially the same, and the main output light from the screen for a higher stage unit module projector and the main output light from the screen for a lower stage unit module projector, are converged to substantially the same point on an audience side, respectively by the functions of said Fresnel sheet means and said prism sheet means.

2. A multi-screen projector according to claim 1, wherein:

said higher stage Fresnel sheet means receives incident light from a projector unit and outputs converging main output light downward;

said lower stage Fresnel sheet means is said higher stage Fresnel sheet means having the same shape as said higher stage Fresnel sheet means and turned upside down, said lower stage Fresnel sheet means receiving incident light from said projector unit and outputting main output light upward to converge to said substantially the same point; and said higher stage prism sheet means and said lower stage prism sheet means have the same shape, said higher and lower stage prism sheet means receiving parallel incident light and outputting main parallel output light tilted substantially in the same direction.

3. A multi-screen projector according to claim 1, wherein:

said higher and lower stage Fresnel sheet means have the same shape, said higher and lower stage Fresnel sheet means receiving incident light from a projector unit, and outputting parallel main output light tilted substantially in the same direction;

said higher stage prism sheet means receives parallel incident light and outputs main output light downward to converge said main output light; and said lower stage prism sheet means is said higher stage prism sheet means having the same shape as said lower stage prism sheet and turned upside down, said lower stage prism sheet means receiving parallel incident light and outputting main output light upward to converge said main output light.

4. A multi-screen projector according to claim 1, wherein:

said higher and lower stage Fresnel sheet means have the same shape, said higher and lower stage Fresnel sheet means receiving incident light from a projector unit and outputting main output light tilted substantially in the same direction;

said higher stage prism sheet means receives parallel incident light and outputs parallel main output light downward; and said lower stage prism sheet means is said higher stage prism sheet means having the same shape as said lower stage prism sheet and turned upside down, said lower stage prism sheet means receiving parallel incident light and outputting parallel main output light upward.

5. A multi-screen projector according to claim 1, wherein:

said higher stage Fresnel sheet means receives incident light from a projector unit and outputs parallel main output light downward;

said lower stage Fresnel sheet means is said higher stage Fresnel sheet means having the same shape as said lower stage Fresnel sheet means and turned upside down, said lower stage Fresnel sheet means receiving incident light from said projector unit and outputting parallel main output light downward; and said higher and lower stage prism sheet means have the same shape, said higher and lower stage prism sheet means receiving parallel incident light and outputting main output light substantially in the same direction to converge said main output light.

6. A multi-screen projector according to any one of claims 2, 3, 4, and 5, wherein the direction of main output light is changed by decentering said higher and lower stage Fresnel sheet means.

7. A multi-screen projector according to any one of claims 2, 3, 4, and 5, wherein the direction of main output light is changed by changing the position of projector units of said higher and lower stage unit module projectors upward or downward relative to a vertical line passing through the center of said screen.

8. A multi-screen projector according to claim 1, wherein said higher and lower stage Fresnel sheet means are decentered and the positions of projector units of said higher and lower stage unit module projectors are changed upward or downward relative to a vertical line passing through the center of said screen, to thereby converging the main output light from said screen for said higher stage unit module projector and the main output light from said screen for said lower stage unit module projector to said substantially the same point on an audience side.

9. A multi-screen projector according to claim 1, wherein the main output light from one of said Fresnel sheet means and said prism sheet means is outputted and converged, and the main light from the other is outputted and converged or diverged.

10. A multi-screen projector having unit module projectors stacked at two higher and lower stages in the vertical direction, each unit module projector having a screen with a Fresnel sheet means disposed on an input side thereof and with a lenticular sheet means disposed on the output side thereof, the multi-screen projector comprising:

a prism sheet means interposed between said Fresnel sheet means and said lenticular sheet means of one of said screens, and a transparent parallel plate interposed between said Fresnel sheet means and said lenticular sheet means of the other of said screens, wherein said Fresnel sheet means of said screens are formed to have substantially the same shape, the direction of main output light at the lower end of the screen for a higher stage unit module projector and the direction of main output light at the lower end of the screen for a lower stage unit module projector are made to be substantially coincident, and the main output light at least from the screen having said prism sheet means is converged substantially to a predetermined point on an audience side.

11. A multi-screen projector according to claim 10, wherein the direction of main output light is changed by decentering said Fresnel sheet means of each said screen.

12. A multi-screen projector according to claim 10, wherein the direction of main output light is changed by changing the position of projector units of each said unit module projectors upward or downward relative to a vertical line passing through the center of said screen.

13. A multi-screen projector according to claim 10, wherein said Fresnel sheet means for each said screen is decentered and the position of a projector unit of each said unit module projector is changed upward or downward relative to a vertical line passing through the center of said screen, to thereby outputting the main output light from said screen for each said unit module projector in the direction toward audiences.

\* \* \* \* \*